United States Patent [19]

Ishikawa et al.

[11] Patent Number: 4,520,367

[45] Date of Patent: May 28, 1985

[54] INK JET HEAD ASSEMBLY

[75] Inventors: Chuji Ishikawa, Kawasaki; Kyuhachiro Iwasaki, Fujisawa; Masanori Horike, Tokyo; Hiromichi Komai, Yokohama, all of Japan

[73] Assignee: Ricoh Company, Ltd., Tokyo, Japan

[21] Appl. No.: 598,133

[22] Filed: Apr. 9, 1984

[30] Foreign Application Priority Data

Apr. 11, 1983 [JP] Japan ................................ 58-63294

[51] Int. Cl.$^3$ ........................................ G01D 15/18

[52] U.S. Cl. ................................ 346/75; 346/140 R

[58] Field of Search ............................ 346/75, 140 R

[56] References Cited

U.S. PATENT DOCUMENTS 3,805,273 4/1974 Brady et al. ........................ 346/75

4,277,790 7/1981 Heibein et al. ...................... 346/75

4,303,928 12/1981 Sugiyama et al. ................... 346/75

*Primary Examiner*—E. A. Goldberg

*Assistant Examiner*—Gerald E. Preston

*Attorney, Agent, or Firm*—David G. Alexander

[57] ABSTRACT

A support mechanism used for securely mounting a head, a charging electrode and a deflection electrode of an ink jet printer on a.carriage. The mechanism includes a hollow cylindrical first holder for detachably holding the head and the charging electrode independently of each other, and a second holder for detachably holding the deflection electrode. The head, charging electrode and deflection electrode are readily mounted and demounted from their associated holders.

7 Claims, 9 Drawing Figures

INK JET HEAD ASSEMBLY

BACKGROUND OF THE INVENTION

The present invention relates to a device for mounting a head, a charging electrode and deflection electrodes of an ink jet printer on a carriage and, more particularly, to a mechanism for supporting them in a secure and detachable manner independently of each other.

A carriage arrangement of a prior art ink jet printer is shown in a plan view in FIG. 1 and in a side view in FIG. 2. FIG 3 is a section along line III—III of FIG. 1.

As shown, a paper 10 is fed from the back of a platen 12 as indicated by an arrow X and therefrom toward a tray (not shown) by way of paper pressure rollers 14 and 16. A carriage 20 is mounted on and movable along parallel carrier shafts 22 and 24. A carriage harness 26 includes therein signal lines for controlling ink drops and tubes for supplying and collecting ink. Ink compressed by a pump (not shown) is admitted in a head 34 via the carriage harness 26, a supply tube 38, a filter 30, and a heater section 32. The head 34 is supported by a holder 36 together with a charging electrode 35 and resiliently backed by a leaf spring 38.

Among ink drops ejected from the head 34, those 40 charged by the charging electrode 35 are deflected by an upper deflection electrode 42*a* and a lower deflection electrode 42*b* to impinge on the paper 10. The other or non-charged ink drops 44 are caught by a gutter 46 to be led to the carriage harness 26 via a bore 48*a* formed though a collection holder 48, then being circulated by the pump. The carriage harness 26 is supported by a presser plate 50 and held between shock absorbing plates 52*a* and 52*b*. Each of the shock absorbing plates 52*a* and 52*b* is made of soft sponge and foamed material. Disposed in front of the carriage 20 is a pad 56 adapted to absorb by capillarity the ink mists which are collected by a mist absorption plate 54. The pad 56 is made of a plastic foamed material.

In the carriage 20 having the above construction, the holder 36 supporting the head 34 is mounted at its front portion on a holder base 58 to be pivotable about a shaft 60 in the perpendicular direction. The holder base 58, on the other hand, is mounted on the carriage 20 to be pivotable about a fulcrum 60*a* in the lateral direction. An adjusting screw 62 adjustably connects a rear portion of the holder 36 and that of the holder base 58, while a compression spring 64 constantly urges the holder 36 upwardly from below. The adjusting screw 62 may be manipulated to move the rear portion of the holder 34 upwardly or downwardly to vary a direction of ink ejection from the head 34 in the vertical direction. The holder base 58 is formed with a notch 66 in its rear portion. An eccentric screw 68 is received in the notch 66 with its shank abutting against the edge of the notch 66. When the eccentric screw 68 is rotated, the holder base 58 will angularly move about the fulcrum 60*a* to cause the holder 36 and, thereby, the head 34 to move to the right or left, varying an axis of ink ejection as desired.

As described above, the prior art carriage allows the direction of ink ejection from the head 34 to be adjusted both in the vertical direction and in the lateral direction so that the ejection axis of the head 34 can be oriented in a predetermined direction to insure stable image quality. Nevertheless, some problems have been left unsolved in such a carriage configuration as will be described.

Because the head 34 includes many stepped portions in its contour and has a large diametrical dimension and a small longitudinal dimension, it is backed by the spring 38 to be positioned in abutting engagement with shoulders of a collar 70. However, due to the vibration of the carriage 20 or like cause, the head 34 tends to tilt effecting the direction of ejection of ink drops from the head 34. Meanwhile, the head holder 36 is shaped concave toward the head 34 and is formed with an aperture 36*a* for the ejection of ink drops. The head 34 is built in or out of such a head holder 36 by inserting the charging electrode 35 in the concavity of the head holder 36, then positioning the collar 70, then mounting the head 34, and then loading the spring 38 to fix the whole construction at once. The gap between the head 34 and the charging electrode 35 in the assembled position is conrolled by cutting the collar 70 to a predetermined length.

The head and charging electrode arrangement discussed above is not fully acceptable in the following respects.

(a) The head has to be disassembled even when the charging electrode 35 is to be replaced with another.

(b) The charging electrode 35 is buried in the holder 36 to make it difficult to extend out a lead.

(c) Due to the use of the collar 70, its dimensional accurary has influence on the mounting accuracy of the whole head 34. Additionally, there is a fear of loosing the collar 70 in the event of replacement.

(d) Because the collar 70 is formed separately from the head holder 36, it is not easy to stably hold the head 34 in a predetermined position and, therefore, the head 34 might be mounted in an inclined position.

(e) The charging electrode 35 needs be made of porous sintered metal in order to absorb ink mist. In practice, use is made of a sintered member of stainless steel for the purpose of eliminating corrosion by ink (weak alkaline). For the same reason, soldering is unapplicable.

Meanwhile, in FIGS. 1 and 3, the upper deflection electrode 42*a* and the lower (ground) deflection electrode 42*b* are spaced several millimters from each other. The upper electrode 42*a* impressed with a voltage of several (−) kilovolts in order to deflect charged ink drops, developing several kilovolts of voltage across the upper and lower electrodes. Therefore, should the gap between the two electrodes 42*a* and 42*b* be reduced by some cause, discharging would occur to invite a machine error. For example, ink mists bouncing off the paper 10 or purging mists (positively charged) would become deposited on the upper electrode 42*a* (negative potential) to render the surfaces of holders 72*a* and 72*b* conductive or substantially conductive, resulting in discharging and, thereby, a machine error.

Further, ink drops impinging on the paper 10 during operation of the printer form mists and part of the mists is allowed into the carriage 20 via an opening 54*a* which is formed through the mist absobing plate 54. The mists inside the carriage 20 are deposited on the upper or negative deflection electrode 42*a* and the holders 72*a* and 72*b* therearound, the deposition spreading with the lapse of time. As shown in FIG. 3, the upper and lower deflection electrodes 42*a* and 42*b* are mounted respectively in central portions of the holders 72*a* and 72*b* which are in turn fastened to the carriage 20 by screws 74. As the ink mists penetrate the carriage 20 via the opening 54*a* of the plate 54 to smear the surfaces of the holders 72*a* and 72*b* until the gap between the upper and lower electrodes 42*a* and 42*b* becomes smaller than a certain value, discharging occurs to make deflection impossible and may even damage an electric circuitry associated with the head. While such a problem may be solved by increasing the distance between the facing surfaces of the holders 72*a* and 72*b* which hold the electrodes 42*a* and 42*b*, it cannot be increased beyond a certain limit.

It has been commonly practiced to amount the deflection electrodes 42*a* and 42*b* on their associated holder 72*a* and 72*b* by, as shown in FIG. 3, tapping the electrodes 42*a* and 42*b* to form threaded bores therein, and fixing them to the holders 72*a* and 72*b* by means of screws 76*a* and 76*b*. However, because the electrodes comprise sintered members of stainless steel taking into account the corrosion by ink as described, the rough or small-density particle structure makes the tapping and, therefore, quantity production difficult.

SUMMARY OF THE INVENTION

It is therefore an object of the present invention to provide a device for mounting on a carriage of an ink jet printer a head, a charging electrode and a deflection electrode.

It is another object of the present invention to provide an improved holder capable of holding a head, a charging electrode and a deflection electrode of an ink jet printer detachably and independently of each other.

It is another object of the present invention to provide a holder capable of supporting a charging electrode and a deflection electrode of an ink jet printer in such a manner as to allow leads from the electrodes to be readily extended out.

It is another object of the present invention to provide a holder for a charging electrode and a deflection electrode of an ink jet printer which is contructed to eliminate discharging due to deposition of ink mists on the electrodes and/or holder.

It is another object of the present invention to provide a generally improved mechanism for holding a head, a charging electrode and a deflection electrode of an ink jet printer.

A mechanism for supporting a head, a charging electrode an a deflection electrode of an ink jet printer on a carriage of the present invention comprises a first holder having a front opening and a rear opening for detachably fixing the head and the charging electrode, the charging electrode being inserted in the first holder through the front opening and the head being inserted in the first holder through the rear opening, and a second holder located in front of the first holder or detachably fixing the deflection electrode.

In accordance with the present invention, a support mechanism used for securely mounting a head, a charging electrode and a deflection electrode of an ink jet printer on a carriage is disclosed. The mechanism includes a hollow cylindrical first holder for detachably holding the head and the charging electrode independently of each other, and second holder for detachably holding the deflection electrode. The head, charging electrode and deflection electrode are readily mounted and demounted from the associated holders.

The above and other objects, features and advantages of the present invention will become apparent from the following detailed description taken with the accompanying drawing.

DESCRIPTION OF THE PREFERRED EMBODIMENTS

While the structure for holding a head, a charging electrode and a deflection electrode of an ink jet printer of the present invention is susceptible of numerous physical embodiments, depending upon the environment and requirements of use, substantial numbers of the herein shown and described embodiments have been made, tested and used, and all have performed in an eminently satisfactory manner.

Figure 3:
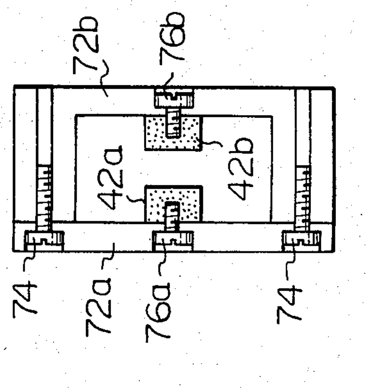
FIG. 3 is a section along line III—III of FIG. 1.
Figure 1:
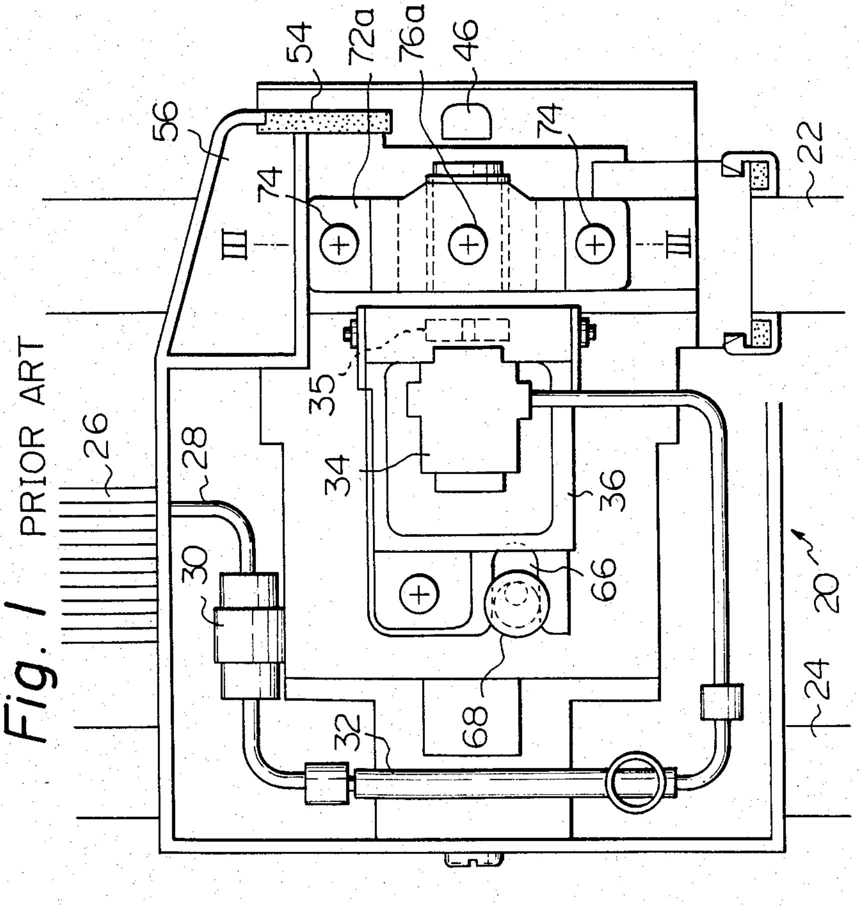
Fig. 1 PRIOR ART
FIG. 1 is a plan view of a carriage installed in a prior art ink jet printer.
Figure 2:
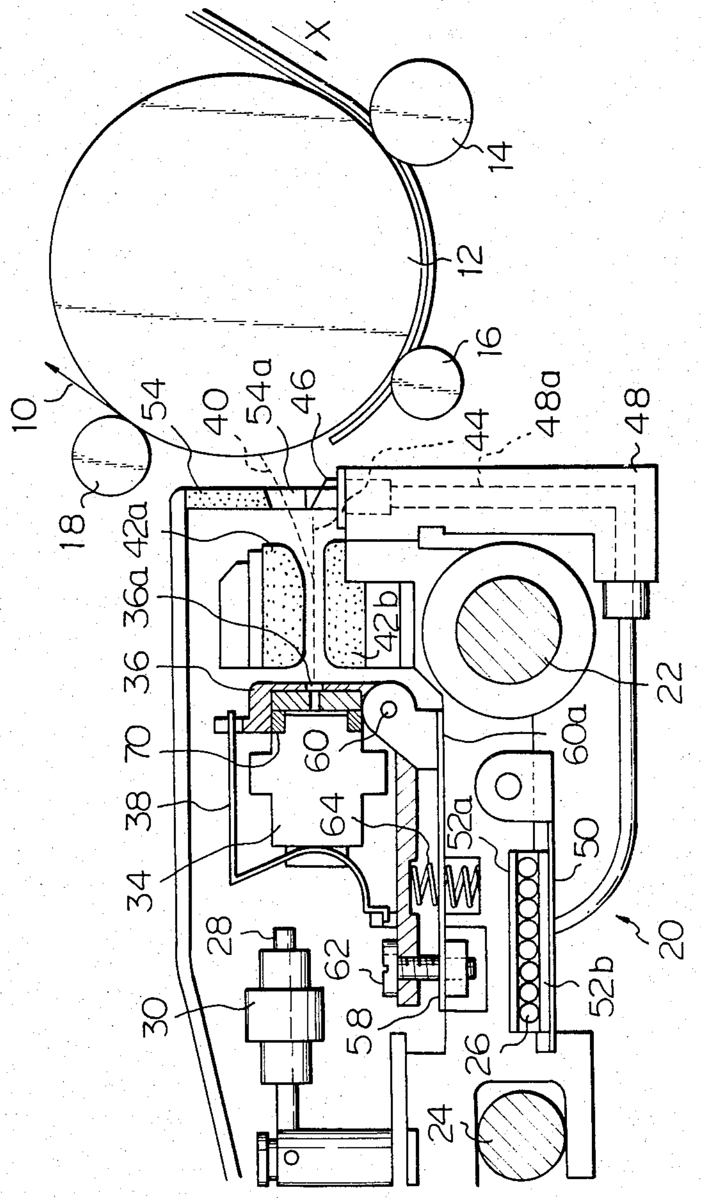
Fig. 2 PRIOR ART
FIG. 2 is a side view of the carriage shown in FIG. 1.
Figure 4:
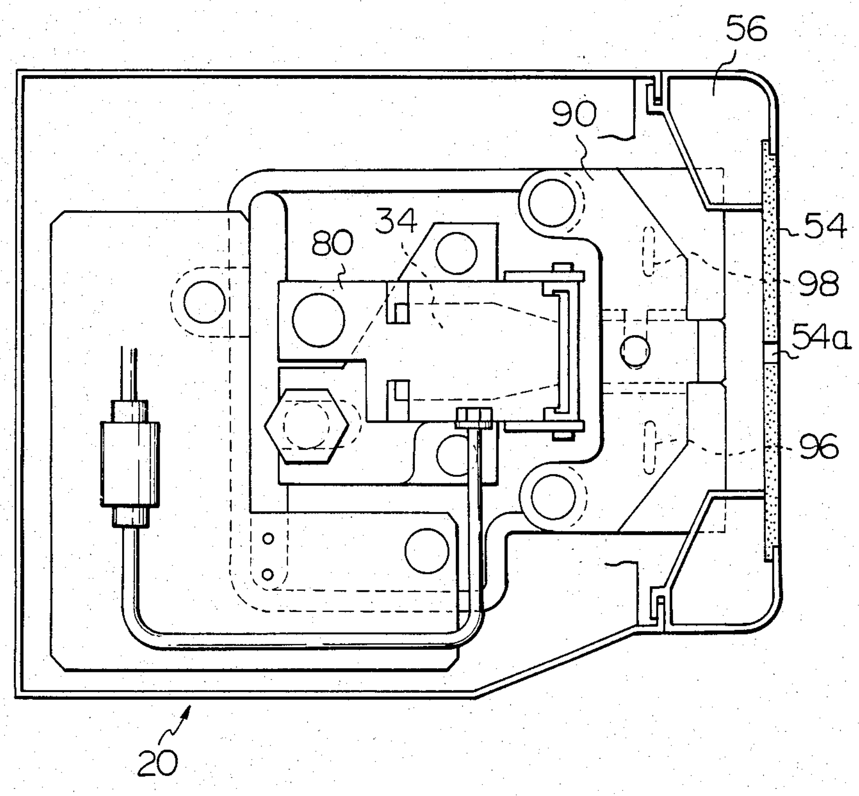
FIG. 4 is a plan view of a printer in which a holder arrangement embodying the present invention is mounted.
Figure 5:
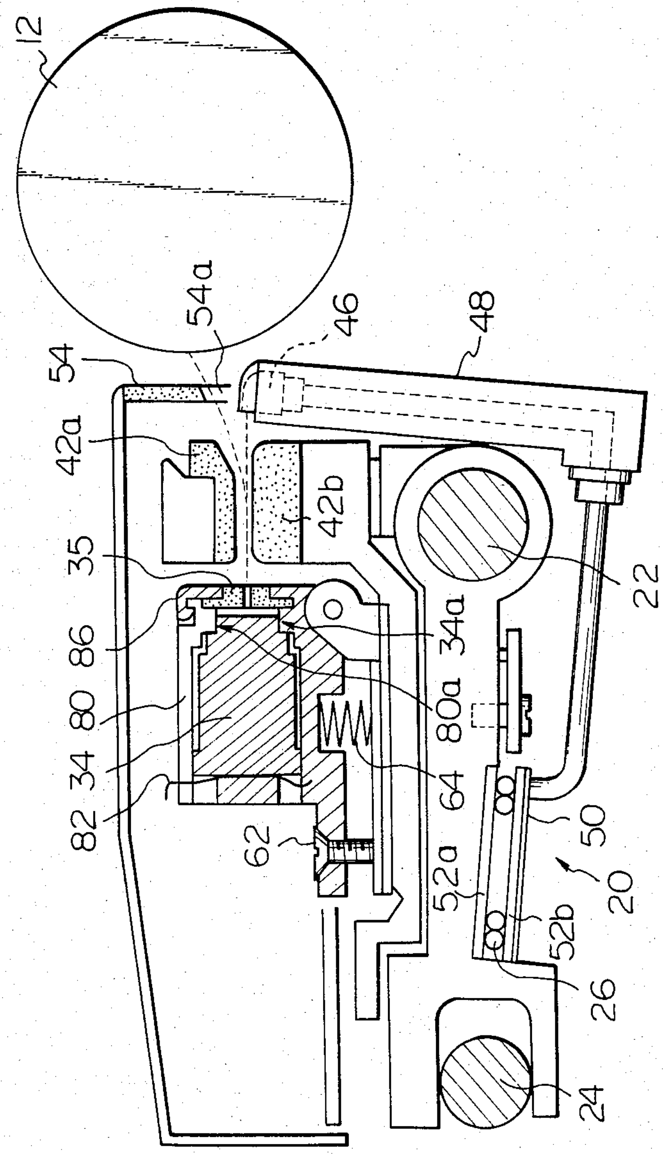
FIG. 5 is a side view of a carriage included in the printer of FIG. 4.
Figure 6:
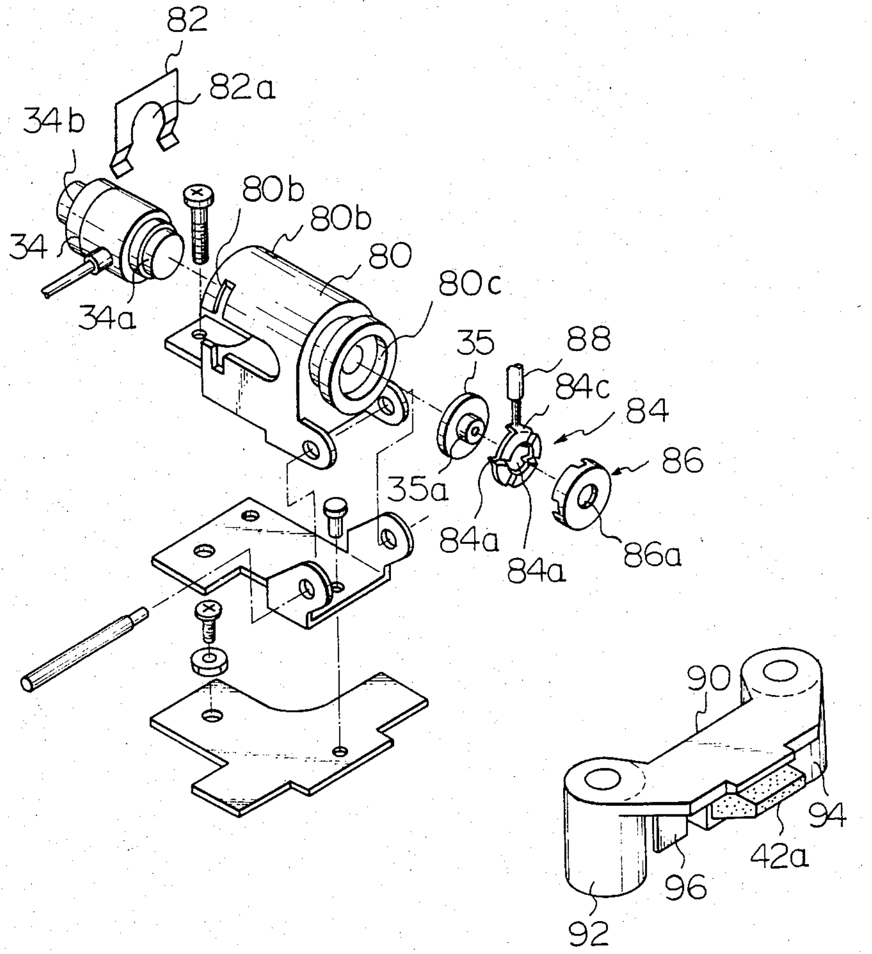
FIG. 6 is a fragmentary exploded perspective view of the holder arrangement in accordance with the present invention.

Referring to FIGS. 4, 5 and 6, a holder arrangement embodying the present invention is shown which is installed in a carriage section of an ink jet printer. In FIGS. 4–6, the same or similar structural elements as those shown in FIGS. 1–3 are designated by like reference numerals.

In FIGS. 4–6, a head holder 80 is dimensioned longer in the longitudinal direction of the carriage 20 than in the lateral direction. In the drawing, the head 34 is inserted in the head holder 80 from the left, and the charging electrode 35 from the right. In detail, the head 34 is put into the head holder 80 from the left until a reduced diameter portion 34*a* at its rightmost end abuts against a smallest diameter portion 80*a* of the head holder 80. The head holder 80 is formed with slots 80*b* at its leftmost end portion, while a leaf spring 82 having a recess 82*a* is received in the slots 80*b*. In assembly, the head 34 is inserted into the head holder 80 and, then, the leaf spring 82 into the slots 80*b* from above the head holder 80, whereby the head 34 is positioned at its rear end 34*b*. In this manner, the head 34 is positioned at opposite ends thereof and, therefore, with increased positional stability to prevent the ejection direction from being changed.

The charging electrode 35 is inserted into the holder 80 from the right in the drawing and positioned by a stepped portion 80*c* of the head holder 80. Thereafter, a leaf spring 84 bifunctioning as a terminal of the charging electrode 35 is inserted into the head holder 80 from the right and, then, a cap 86 made of plastic is fit on the head holder 80 to fix the electrode 35 and leaf spring 84 in position. That is, because soldering is unsuitable for the charging electrode 35, the leaf spring or terminal 84 is employed as a special member for extending out a terminal of the charging electrode; the terminal 84 is engaged with the charging electrode 35 to apply a potential thereto. In such a construction, the inserting directions of the head 34 and the charging electrode 35 are different from each other so that they can be mounted and demounted independently of each other. This eliminates the need for the collar 70 and the like shown in FIG. 2 and, due to the integral assembly of the head and electrode 35 with the head holder 80, allows no play to develop.

The leaf spring 84 is made of stainless steel for enhancing resistivity to corrosion, fast contact and the like, while being partly formed with generally V-shaped bends 84*a* to have a spring property. The leaf spring 84 is formed with an opening 84*b* and the cap 86 with an opening 86*a*. The openings 84*b* and 86*b* are calibrated to allow a stepped portion 35*a* of the charging electrode 35 to pass therethrough, so that the leaf spring 84 and cap 86 are coaxially retained by the stepped portion 35*a* without dislocation. A lead 88 is connected to the terminal and spring 84 by calking means 84*c*.

A deflection electrode holder 90 includes support portions 92 and 94 for mounting the holder 90 to the carriage 20. The support portions 92 and 94 are positioned rearwardly of the rest of the holder 90 to be remote from an opening 54*a* through which ink mists may enter, thereby allowing a larger gap defined between the upper and lower deflection electrodes 42*a* and 42*b*. Furthermore, skirt portions 96 and 98 are interposed between the support portions 92 and 94 and the opening 54*a* to intercept ink mists. Such an arranement substantially eliminates deposition of ink mists on the support portions 92 and 94 and, thereby, smearing of the surfaces of the deflection electrode holder 90 which would otherwise constitute a cause of discharging.

Figure 7:
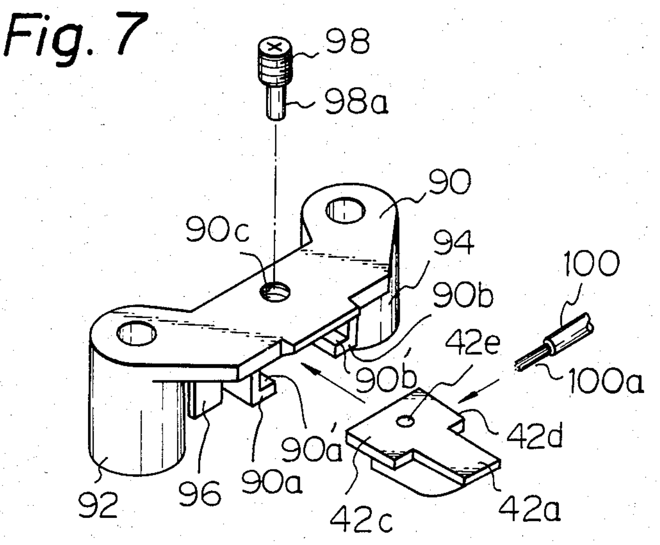
FIG. 7 is a fragmentary exploded perspective view illustrative of an assembly of a holder and a deflection electrode.
Figure 8:
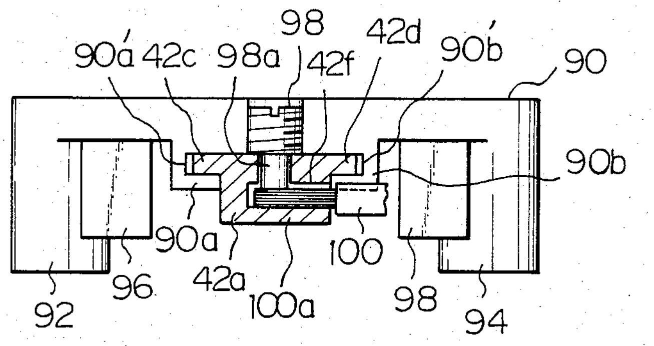
FIG. 8 is a fragmentary section of the holder and deflection electrode in an assembled position.

Referring to FIG. 7, a manner of mounting the deflection electrode 42*a* is shown. The deflection electrode 42*a* is shown in FIG. 8 in its assembled position in the holder 90. As shown, the electrode 41*a* is formed with projections 42*c* and 42*d*, while the holder 90 is formed with downwardly extending arms 90*a* and 90*b*. The arms 90*a* and 90*b* are so shaped as to respectively define recesses 90'*a* and 90'*b* in which the projections 42*c* and 42*d* are engagable. With the projections 42*c* and 42*d* respectively aligned with the recesses 90'*a* and 90'*b*, the electrode 42*a* is inserted into the holder 90 as indicated by an arrow in the drawing to thereby position the former relative to the latter. The holder 90 is formed with a tapped bore 90*c* in which a stepped screw 98 having a reduced diameter portion 98*a* is engagable. The electrode 42*a* is formed with a bore 42*e* for receiving the smaller diameter portion 98*a* of the screw 98. After the electrode 42*a* has been inserted into the holder 90, the screw 98 is driven into the tapped bore 90*c* to fix the electrode 42 in place. The electrode 42*a* may also be formed with a transverse bore 42*f* which extends perpendicular to and communicates to the bore 42*e*, in which case a lead 100 will be inserted into the transverse bore 42*f* with its core 100*a* pressed down against the electrode 42*a* by the tip of the screw 98.

Figure 9:
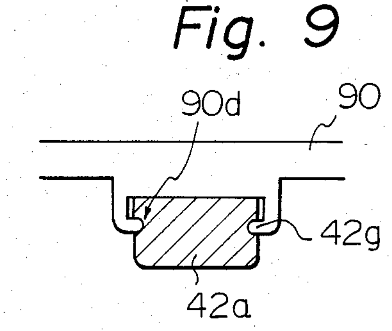
FIG. 9 is a fragmentary section illustrative of another example of the assembly of the holder and deflection electrodes.

Another example of the structure for mounting the electrode 42*a* to the holder 90 is shown in FIG. 9. In the example, the electrode 42*a* is formed with a generally V-shaped recesses 42*g* and the holder 90, lugs 90*d* engagable with the recesses 42*g*. Again, the electrode 42 is inserted into the holder 90 with the recesses 42*g* aligned with the lugs 90*d*.

To position the deflection electrode 42*a* in the longitudinal direction, the holder 90 may be provided with a suitable stop. It is more desirable, however, that the holder 90 be formed with the tapped bore 90*c* and the electrode 42*a* with the bore 42*e* as previously described, then the screw 98 bifunctioning to press the lead 100 against the electrode 42*a*.

Various modifications will become possible for those skilled in the art after receiving the teachings of the present disclosure without departing from the scope thereof.

What is claimed is:

1. A mechanism for supporting a head, a charging electrode and a deflection electrode of an ink jet printer on a carriage, comprising:
   - first holder means having a front opening and a rear opening for detachably fixing the head and the charging electrode, the charging electrode being inserted into said first holder means through said front opening and the head being inserted into said first holder means through said rear opening; and
   - second holder means located in front of the first holder means for detachably fixing the deflection electrode;
   - the first holder means comprising a holder body having a first stepped portion with which an end portion of the head is engagable to fix the head in place and a second stepped portion for receiving the charging electrode to fix the charging electrode in place;
   - the first holder means further comprising spring means mounted in a rear portion of the holder body for biasing a rear end portion of the inserted head;
   - the spring means comprising a leaf spring formed with an opening for engagement with the head, the holder body comprising slots which are formed through a rear wall portion of the holder body to receive said leaf spring.

2. A mechanism for supporting a head, a charging electrode and a deflection electrode of an ink jet printer on a carriage, comprising:
   - first holder means having a front opening and a rear opening for detachably fixing the head and the charging electrode, the charging electrode being inserted into said first and holder means through said front opening and the head being inserted into said first holder means through said rear opening; and
   - second holder means located in front of the first holder means for detachably fixing the deflection electrode;
   - the first holder means comprising a holder body having a first stepped portion with which an end portion of the head is engagable to fix the head in place and a second stepped portion for receiving the charging electrode to fix the charging electrode in place;
   - the first holder means further comprising a member for fixedly retaining the charging electrode in the second stepped portion and extending out a lead for the charging electrode, said member being fixed to the second stepped portion integrally and in electrical contact with the charging electrode.

3. A mechanism as claimed in claim 2, in which the first holder means further comprises spring means mounted in a rear portion of the holder body for biasing a rear end portion of the inserted head.

4. A mechanism for supporting a head, a charging electrode and a deflection electrode of an ink jet printer on a carriage, comprising:

first holder means having a front opening and a rear opening for detachably fixing the head and the charging electrode, the charging electrode being inserted into said first holder means through said front opening and the head being inserted into said first holder means through said rear opening; and second holder means located in front of the first holder means for detachably fixing the deflection electrode;

the second holder means comprising a holder body for fixing the deflection electrode in place, and a pair of support members for supporting said holder body, said support members being formed integrally with said holder body in such a manner as to be positioned rearwardly of the holder body and the fixed deflection electrode;

the second holder means further comprising a pair of plates for intercepting an ink mist which are formed forwardly of the support members.

5. A mechanism for supporting a head, a charging electrode and a deflection electrode of an ink jet printer on a carriage, comprising:

first holder means having a front opening and a rear opening for detachably fixing the head and the charging electrode, the charging electrode being inserted into said first holder means through said front opening and the head being inserted into said first holder means through said rear opening; and second holder means located in front of the first holder means for detachably fixing the deflection electrode;

the second holder means comprising a holder body for fixing the deflection electrode in place, and a pair of support members for supporting said holder body, said support members being formed integrally with said holder body in such a manner as to be positioned rearwardly of the holder body and the fixed deflection electrode;

the second holder means further comprising fixing means for fixing the deflection electrode to the holder body;

the fixing means comprising an engaging portion formed in the deflection electrode and an engaging portion formed in the holder body to be engagable with said engaging portion of the deflection electrode;

the engaging portion of the holder body being concave and the engaging portion of the deflection electrode being convex.

6. A mechanism for supporting a head, a charging electrode and a deflection electrode of an ink jet printer on a carriage, comprising:

first holder means having a front opening and a rear opening for detachably fixing the head and the charging electrode, the charging electrode being inserted into said first holder means through said front opening and the head being inserted into said first holder means through said rear opening; and second holder means located in front of the first holder means for detachably fixing the deflection electrode;

the second holder means comprising a holder body for fixing the deflection electrode in place, and a pair of support members for supporting said holder body, said support members being formed integrally with said holder body in such a manner as to be positioned rearwardly of the holder body and the fixed deflection electrode;

the second holder means further comprising fixing means for fixing the deflection electrode to the holder body;

the fixing means comprising an engaging portion formed in the deflection electrode and an engaging portion formed in the holder body to be engagable with said engaging portion of the deflection electrode;

the engaging portion of the holder body being convex and the engaging portion of the deflection electrode being concave.

7. A mechanism for supporting a head, a charging electrode and a deflection electrode of an ink jet printer on a carriage, comprising:

first holder means having a front opening and a rear opening for detachably fixing the head and the charging electrode, the charging electrode being inserted into said first holder means through said front opening and the head being inserted into said first holder means through said rear opening; and second holder means located in front of the first holder means for detachably fixing the deflection electrode;

the second holder means comprising a holder body for fixing the deflection electrode to the holder body;

the fixing means comprising an engaging portion formed in the deflection electrode and an engaging portion formed in the holder body to be engagable with said engaging portion of the deflection electrode;

the fixing means further comprising a stepped screw for fastening the deflection electrode in an engaged position to the holder body;

the fixing means further comprising a threaded portion formed in the holder body for engagement with a large diameter threaded portion of the stepped screw, and a bore formed in the deflection electrode for engagement with a small diameter non-threaded portion of the stepped screw;

the deflection electrode being further formed with a bore for laying a lead for the deflection electrode, said bore extending perpendicular to and intersecting the bore in which the small diameter non-threaded portion of the stepped screw is engagable such that an end of the non-threaded portion of the stepped screw clamps the lead to the deflection electrode.

* * * * *